(12) United States Patent
Backaert et al.

(10) Patent No.: US 11,160,415 B2
(45) Date of Patent: Nov. 2, 2021

(54) MICROWAVE REHEATING CONTAINER

(71) Applicant: Dart Industries Inc., Orlando, FL (US)

(72) Inventors: Dimitri M. C. J. Backaert, Moorsel (BE); Laurent Tabey, Montbazon (FR); Steven J. Verbrugge, Ghent (BE); Kris Schoukens, Zweveqem (BE); Berivan Özel, Brussels (BE); Johan Carrette, Brussels (BE)

(73) Assignee: Dart Industries Inc., Orlando, FL (US)

( * ) Notice: Subject to any disclaimer, the term of this patent is extended or adjusted under 35 U.S.C. 154(b) by 578 days.

(21) Appl. No.: 15/969,121

(22) Filed: May 2, 2018

(65) Prior Publication Data
US 2019/0335946 A1 Nov. 7, 2019

(51) Int. Cl.
*A47J 36/02* (2006.01)
*A47J 27/00* (2006.01)
*A47J 36/10* (2006.01)
*B65D 81/34* (2006.01)

(52) U.S. Cl.
CPC .......... *A47J 36/027* (2013.01); *A47J 27/002* (2013.01); *A47J 36/10* (2013.01); *B65D 81/3453* (2013.01)

(58) Field of Classification Search
CPC .............. B65D 77/225; B65D 81/3453; B65D 2205/00
See application file for complete search history.

(56) References Cited

U.S. PATENT DOCUMENTS

| | | | | |
|---|---|---|---|---|
| 4,809,868 A | * | 3/1989 | Pomroy | B65D 43/0218 220/260 |
| 4,892,213 A | * | 1/1990 | Mason, Jr. | A47G 19/02 206/508 |
| 4,952,765 A | * | 8/1990 | Toyosawa | A47J 36/027 219/735 |
| 5,039,001 A | * | 8/1991 | Kinigakis | B65D 77/225 229/120 |
| 5,057,331 A | * | 10/1991 | Levinson | A47J 36/027 219/732 |
| 5,065,889 A | * | 11/1991 | Conti | A47G 19/027 220/360 |
| 5,223,291 A | * | 6/1993 | Levinson | A47J 36/027 426/241 |
| 5,310,981 A | * | 5/1994 | Sarnoff | A47J 27/088 126/369 |
| 5,521,361 A | * | 5/1996 | Strait, Jr. | H05B 6/802 219/731 |
| 5,931,333 A | * | 8/1999 | Woodnorth | A47J 43/24 220/367.1 |
| 5,948,309 A | * | 9/1999 | Nelson | A47J 27/122 219/731 |
| 6,307,193 B1 | * | 10/2001 | Toole | A47J 36/06 126/386.1 |

(Continued)

*Primary Examiner* — Ibrahime A Abraham
*Assistant Examiner* — Gyounghyun Bae
(74) *Attorney, Agent, or Firm* — Taylor J. Ross

(57) ABSTRACT

A microwave reheating container for food including a concave base and a cover. The base and cover both have a core formed of PET sheet material, formed into the appropriate base and cover shapes. The PET cores are crystallized to CPET on their interior. Each core is overmolded on its exterior with TPC capable of injection molding and having greater strength. The cover may include an elastomeric seal about its periphery. The cover may be secured to the base by one or more locking clips.

16 Claims, 2 Drawing Sheets

(56) References Cited

U.S. PATENT DOCUMENTS

| | | | | |
|---|---|---|---|---|
| 6,609,627 B1 * | 8/2003 | Clarke | B65D 43/162 | 219/734 |
| 6,649,891 B1 * | 11/2003 | Kitko | A47J 36/027 | 219/725 |
| 6,803,551 B2 * | 10/2004 | Kim | A47J 36/027 | 219/729 |
| 6,952,000 B2 * | 10/2005 | Ohyama | A47J 27/04 | 126/369 |
| 7,090,089 B2 * | 8/2006 | Lown | B65D 43/0218 | 220/324 |
| 7,090,090 B2 * | 8/2006 | Ohyama | B65D 43/021 | 220/367.1 |
| 7,109,455 B2 * | 9/2006 | Hopkins, Sr. | A47J 36/027 | 219/734 |
| 7,131,289 B2 * | 11/2006 | Hari | A47J 41/0044 | 62/457.2 |
| 7,357,272 B2 * | 4/2008 | Maxwell | B65D 43/0208 | 220/366.1 |
| 7,582,340 B2 * | 9/2009 | Hagino | A47J 36/027 | 220/495.03 |
| D617,150 S | 6/2010 | Olivari | | |
| 7,824,749 B2 * | 11/2010 | Dawes | B32B 7/12 | 428/35.7 |
| 7,923,506 B2 * | 4/2011 | Cohoon | C08L 67/02 | 524/605 |
| 8,071,923 B2 * | 12/2011 | McMahan | B65D 81/3453 | 219/725 |
| 8,071,925 B2 * | 12/2011 | Vovan | A47J 27/04 | 219/732 |
| 8,418,871 B1 * | 4/2013 | LaMasney | B65D 45/18 | 220/324 |
| 8,613,612 B2 * | 12/2013 | Middleton | B65D 43/162 | 425/112 |
| 8,772,685 B2 | 7/2014 | Backaert et al. | | |
| 8,802,207 B2 * | 8/2014 | Akkapeddi | B65D 43/00 | 428/35.8 |
| 9,155,132 B2 * | 10/2015 | Cheung | H05B 6/6408 | |
| 9,340,316 B2 * | 5/2016 | Schmitz | B65D 81/267 | |
| 9,801,488 B2 * | 10/2017 | Affatato | A47J 27/04 | |
| 10,173,826 B2 * | 1/2019 | Sexton | B65D 45/18 | |
| 2003/0116572 A1 * | 6/2003 | Klock | B65D 51/1683 | 220/367.1 |
| 2006/0014022 A1 * | 1/2006 | Kendig | B29D 22/003 | 428/421 |
| 2008/0041850 A1 * | 2/2008 | Tucker | B65D 21/0222 | 220/212 |
| 2009/0120937 A1 * | 5/2009 | Vovan | B65D 43/0206 | 220/266 |
| 2010/0221391 A1 * | 9/2010 | Deng | B65D 81/2015 | 426/114 |
| 2013/0206636 A1 * | 8/2013 | Asthana | C08G 63/553 | 206/524.6 |
| 2016/0000245 A1 * | 1/2016 | Sims | B65D 43/02 | 220/253 |
| 2017/0136747 A1 * | 5/2017 | Torradas | B32B 27/08 | |
| 2017/0158404 A1 * | 6/2017 | Gillespie | B32B 27/32 | |

* cited by examiner

MICROWAVE REHEATING CONTAINER

CROSS REFERENCE TO RELATED APPLICATIONS

Not applicable.

STATEMENT REGARDING FEDERALLY SPONSORED RESEARCH

Not applicable.

BACKGROUND OF THE INVENTION

The present invention relates in general to containers for reheating food in a microwave oven.

It is common for food to be reheated in microwave ovens. However, restrictions have made such containers difficult to manufacture and operate well. First, metal typically cannot be used in a microwave oven and if used will shield the food from microwave energy, which eliminates use of that material. Certain glass materials are microwave safe and quite durable, but these are expensive and have poor tolerances. Thermoplastic containers are known, with varying success depending upon the particular thermoplastic composition. Polycarbonate had been a good choice, with high heat tolerance and good strength, but this material is no longer considered safe for food contact. Polypropylene is food safe and has reasonably good heat tolerance and strength, but heating of oily food often results in localized overheating leading to bubbles on the inner surface. Some formulations of polyethylene are food safe, and are commonly used for single use containers for prepackaged frozen food, but these formulations have low structural strength which may lead to inadvertent spills of very hot food.

SUMMARY OF THE INVENTION

An object of the present invention is to provide a microwave reheating container A further object of the present invention is to provide a microwave reheating container having high heat resistance and good structural strength.

These and other objects are achieved by a microwave reheating container. The container for food including a concave base and a cover. The base and cover both have a core of PET sheet material, formed into the appropriate base and cover shapes. Each core is overmolded on its exterior with a second PET formulation capable of injection molding and having greater strength. The cover may include an elastomeric seal about its periphery. The cover may be secured to the base by two or more locking clips.

BRIEF DESCRIPTION OF THE DRAWINGS

The objects and features of the invention noted above are explained in more detail with reference to the drawings, in which like reference numerals denote like elements, and in which.

DETAILED DESCRIPTION OF THE INVENTION

Figure 1:
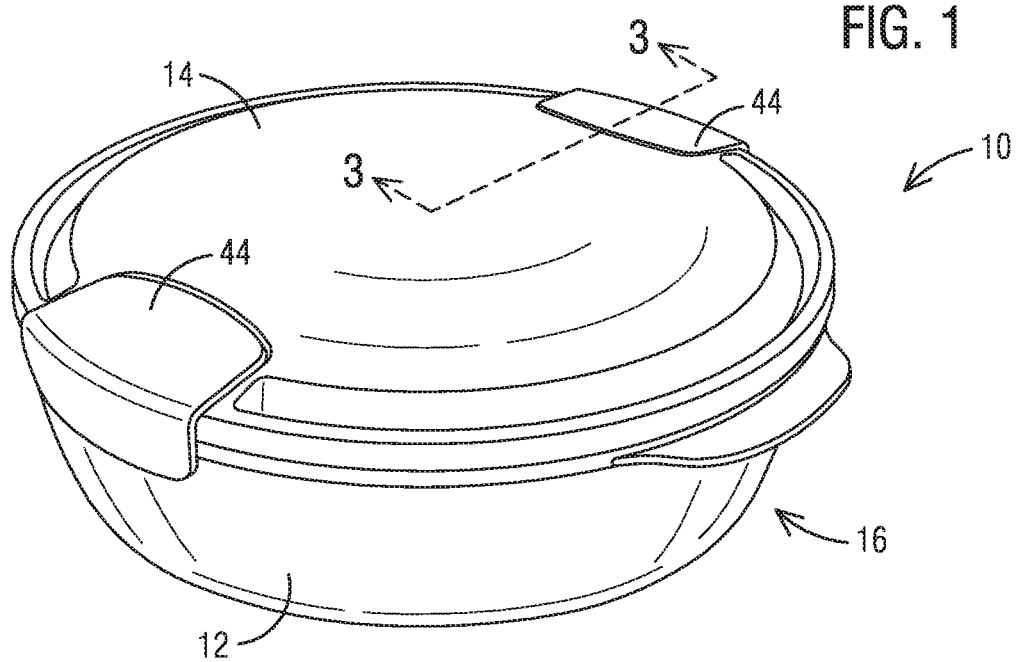
FIG. 1 is a top isometric view of the microwave reheating container according to the present invention.
Figure 2:
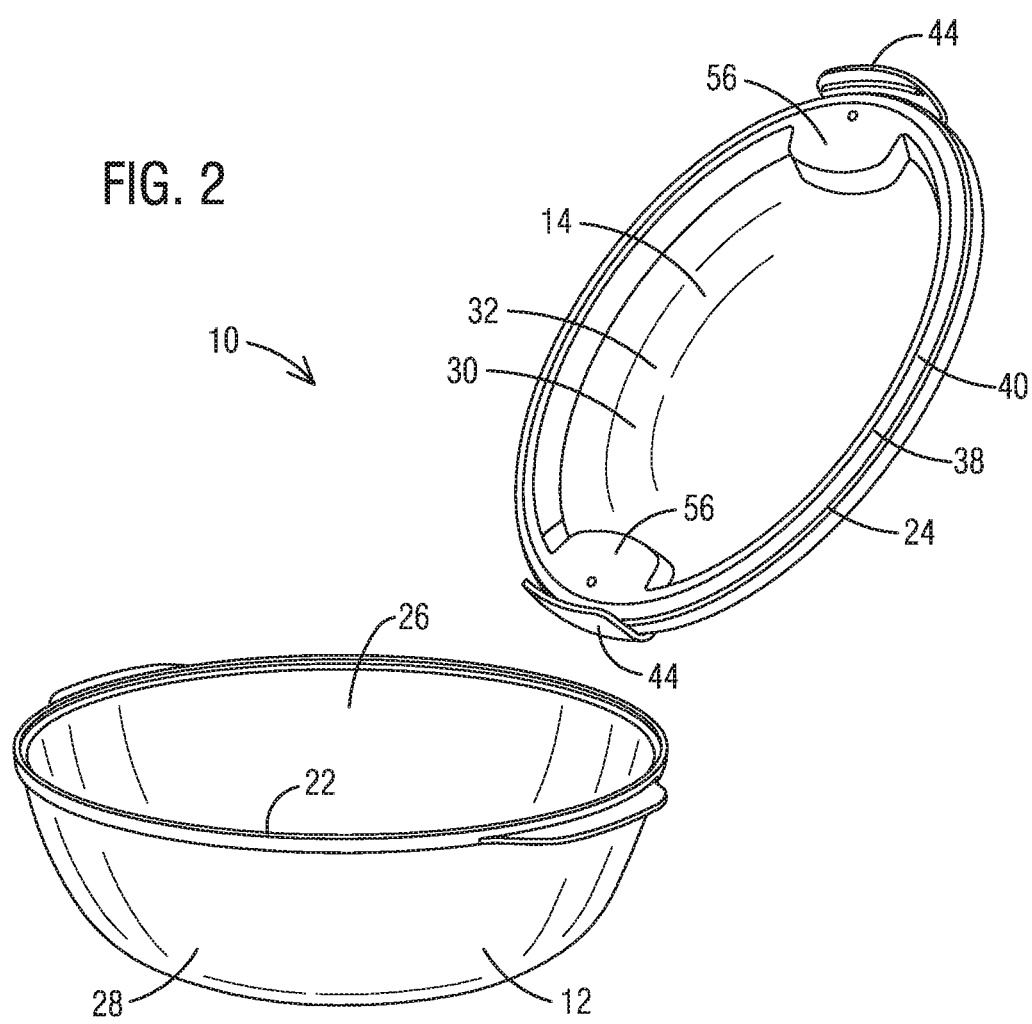
FIG. 2 is top isometric exploded view.

With reference to FIG. 1, a microwave reheating container according to the present invention is generally designated by reference numeral 10. The container 10 generally includes a base 12 and a cover 14, which together define a heating chamber 16. The base 12 is concave upward, with a bottom section 18 transitioning into one or more sidewalls 20 which terminate at a base rim 22. In the embodiment shown, the base 12 is formed as a circular bowl having a single side wall, but other forms are possible, such as oval, square, rectangular, etc.

The cover 14 will have a cover rim 24 at its periphery, with the cover rim 24 having a size and shape to match the base rim 22. The interior portion of the cover 14 may take many forms, including flat, concave upward, or concave downward. In the preferred embodiment shown the cover 14 is concave downward.

The container 10 is intended for reheating food within a microwave oven (not shown). This can result in high temperature food coming into contact with the container 10. To permit this in a durable reusable product, the container 10 includes an inner layer of material suitable to withstand high heat, supported by a second material providing structural strength and insulation against excessive heat transfer.

In the preferred form shown, the base 12 includes a base core 26 which is overmolded with a base coating 28. Similarly, the cover 14 includes a cover core 30 which is overmolded with a cover coating 32. The choices of materials for these cores and coating are very important to the present invention.

The base and cover cores 26 and 30 are both formed of a thermoplastic raw material (hereafter TRM) capable of crystallization. One preferred material is polyethylene terephthalate (hereafter PET). As used herein, PET is a special case of TRM and all discussion of PET may equally apply to other formulations of TRM. PET has a typical form which is amorphous, and this form will be referred to as APET. APET provides reasonable heat tolerance, and may be injection molded. However, PET also has another form, which is crystalline, and this form will be referred to as CPET. CPET has much higher heat tolerance compared to APET. The process for converting APET to CPET involves specific heating and cooling which are known in the art. Unfortunately, the heating and cooling required to form CPET is very difficult to achieve using injection molding techniques, and is essentially not available for large scale production of consumer goods. Instead, CPET is usually formed by extruding a sheet of APET and forming rolls. Two rolls of APET are combined to a two layer sheet, and this sheet is fed to a cavity and punch having the desired final container shape. The cavity is heated and then cooled during the forming process such that the final container form has an inner layer remaining APET, but the outer layer (adjacent the heated and cooled cavity) has been converted to CPET. This is a prior art techniques and is employed for mass produced frozen food intended to be microwave reheated. In use, the outer layer of CPET provides needed strength during reheating, and there is little concern if the inner APET layer is slightly heat damaged during reheating—the container is a single use item.

The present invention is directed toward durable multiuse containers, however, and as such it is desired to reverse the usual process and form the CPET layer on the interior of the cores 26 and 30 such that the interior of the cores 26 and 30 have the greatest resistance to heat damage (bubbling, partial melting, etc.). It may be possible to reverse the usual cavity and plunger arrangement such that the cavity is neutral while the plunger is heated and cooled. In this way the CPET layer may be formed on the interior, food-contact face. A preferred method is to create a mold core having the desired shape, and which includes heating and cooling and then to vacuum form over this mold core. With this arrangement the mold core is on the interior of the finished product, and as such the CPET layer is formed on the interior, food-contact face.

While this arrangement improves the heat resistance of the cores 26 and 32, it creates a problem in that few materials will bond with APET for the overmolding of the coatings 28 and 23, and even fewer with the desired strength, flexibility, heat resistance and molding properties. One such material having the desired characteristics is thermoplastic copolyester (hereafter TPC) such as that under the trademark Arnitel® available from DSM. This TPC is based upon the PET molecule, and as such has good bonding with APET. As such, the present invention includes cores 26 and 30 formed of PET including a CPET interior layer and (if required) an APET exterior layer. The exterior faces of such cores are overmolded with coatings 28 and 32 formed of TPC. While providing the desired heat resistance and strength characteristics for the container 10, this creates a further problem in that most TPCs are not approved for food contact due to the additives which allow injection molding.

Figure 4:
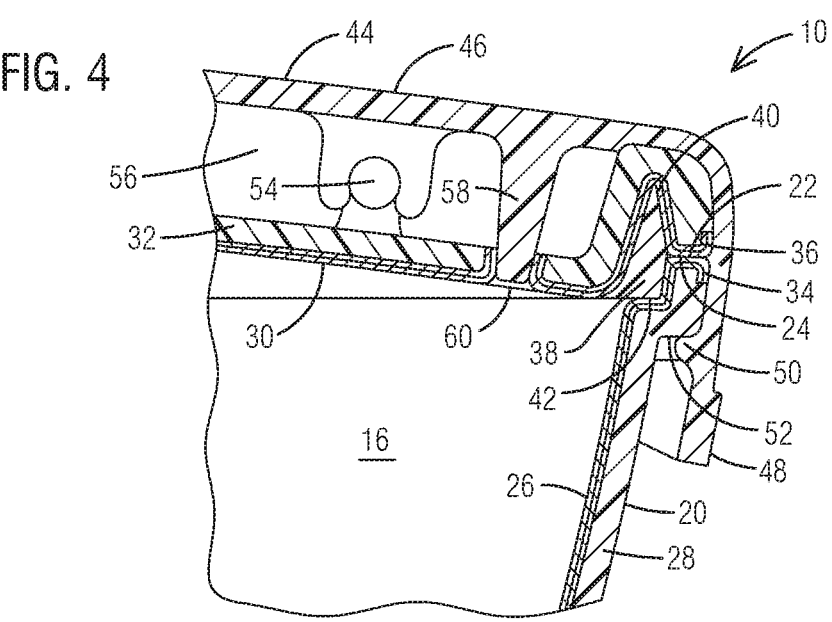
FIG. 4 is a detail cross-sectional view along line 3-3 of FIG. 1.

The present invention therefore includes a further structural arrangement to avoid contact of the food with the coatings 28 and 32, best illustrated in FIG. 4. In particular, the base core 26 extends as a monolithic unit from the sidewall 20 to extend across the base rim 22 and at the radially outer edge extends downward to form a base core flange 34. Similarly, the cover core 30 extends as a monolithic unit to extend across cover rim 24 and at the radially outer edge extends upward to form a cover core flange 36. By this arrangement food within the heating chamber 16, food on the rims 22 and/or 24, and a portion of the food extending over the edge of the rims 22 and/or 24, will contact only PET and will not contact the TPC.

The cover 14 may simply rest upon the base 12, but given the high temperature intended use, it is preferred to prevent cover 14 from being too easily dislodged. This would allow steam or hot food to escape the heating chamber 16, or the cover 14 could fall and contact the user, in both situations potentially burning the user. To prevent this, the cover 14 may be sized slightly larger than the base, and have a downward extending flange (not shown) to surround the base rim 22. Alternatively, the base 12 and cover 14 may include a peripheral structure similar to the typical pot and lid arrangement.

While it is sufficient for the cover 14 to simply rest securely upon the base 12, it is preferred to provide for sealing of the container 10 to allow for refrigerated storage as well as microwave reheating. On common method for creating a sealing cover is to provide both rims 22 and 24 with mating undercuts similar to those formed on plastic storage containers such as Tupperware brand products. This is not a viable solution, however, as the sheet forming process for the three dimensional PET core structures do not permit undercuts.

To create a sealing connection between base 12 and cover 14 using these PET cores, the cover 14 is provided with an elastomeric (such as silicone) sealing ring 38. The sealing ring may be secured to or adjacent the base rim 22, or secured to or adjacent the cover rim 24. In the preferred embodiment shown, the sealing ring is secured adjacent cover rim 24. Various arrangements are possible for securing the sealing ring in place. In the preferred embodiment the cover 14 includes a groove 40 extending continuously about the periphery of cover 14, and immediately radially inward of cover rim 24. The sealing ring 38 is sized and configured to fit within this groove 40. The sealing ring 38 is sized slightly shorter than the length of groove 40 such that the sealing ring 38 is stretched slightly to be placed in groove 40 and thus contracts against the inner face of groove 40 to hold the sealing ring 38 in place.

Figure 3:
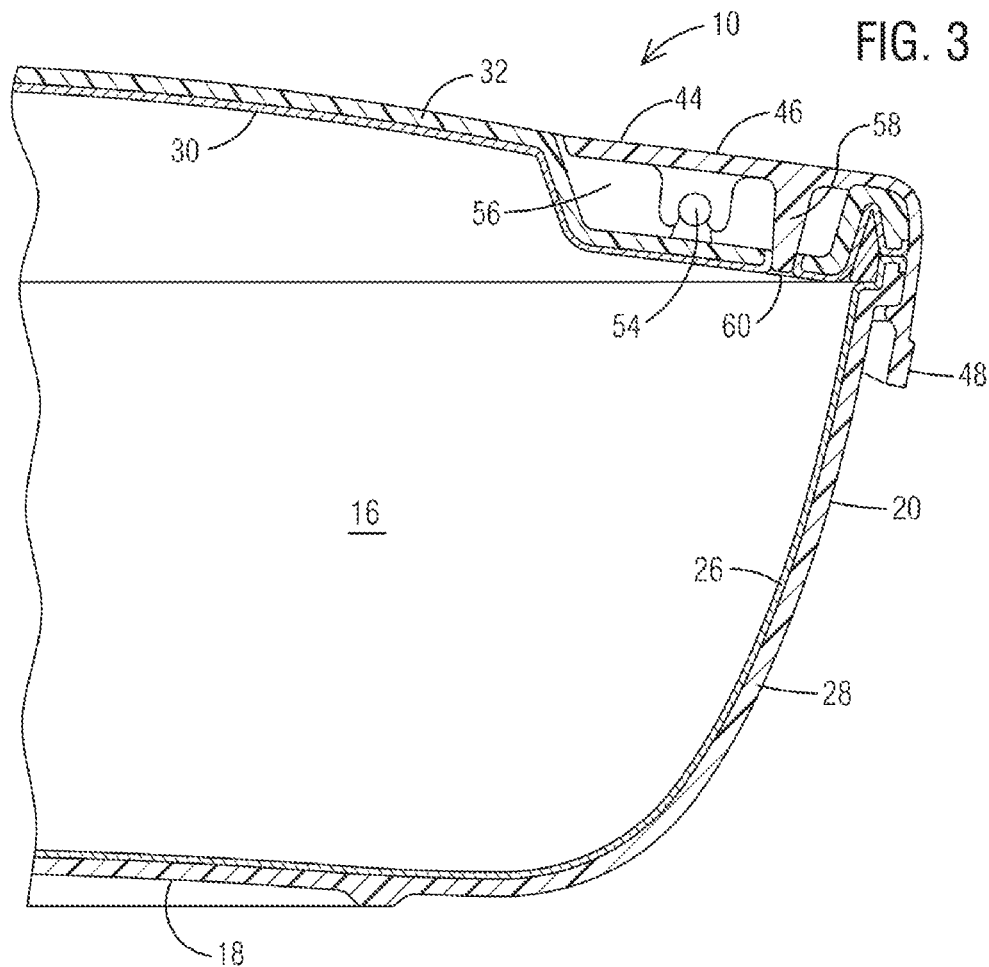
FIG. 3 is a partial cross-sectional view along line 3-3 of FIG. 1.

The lower face of sealing ring 38 will press against the base 12 to form the desired sealing of heating chamber 16. This could take the form of sealing ring 38 pressing against the base rim 22 (not shown). It is preferred, however, to form a sealing ledge 42 immediately radially inward of the base rim 22 and to have the base rim 22 and cover rim 24 sized such that they are opposed when the cover 14 is in place upon base 14, as shown in FIGS. 3 and 4. In this manner the sealing ledge 42 will be arranged below the groove 40 and at least a portion of sealing ring 38. The lower face of sealing ring 38 will thus compress against the sealing ledge 42 when cover 14 is in place.

While this arrangement can provide a sealed heating chamber 16 under ideal conditions, the cover 14 could still be dislodged by rough handling to break the seal. To prevent this, it is preferred that the over 14 include one or more locking clips 44. Each locking clip 44 has a general right angle configuration with a mounting portion 46 generally in the plane of the cover 14, and a roughly perpendicular latch portion 48 extending downward along the sidewall 20. This latch portion will include a radially interior ridge 50 which may be frictionally received under a radially extending mounting edge 52 (conveniently formed together with the overmolding of sealing ledge 42).

The mounting portion may be secured to the cover 14 by various means including adhesives, thermal welding, overmolding, etc. By forming the locking clips 44 of a thermoplastic material, the latch portion will be slightly elastic and allow outward bending to permit ridge 50 to slide over base rim 22 and contract beneath mounting edge 52. An extension of the latch portion 48 may provide a gripping surface for the user to grasp the latch portion 48 to bend it outward to release the ridge 50 for opening of the container 10.

It is most preferred, however, that the mounting portion 46 be secured to cover 14 via a trunnion combination 54 to permit rotation of the locking clip 44 about the trunnion combination 54. This trunnion combination requires a minimum height. While it might extend upwardly from the general plane of the over 14, it is preferred that the cover 14 include pivot depressions 56 formed therein beneath each locking clip 44. The trunnion combination 54 is then located within the pivot depression with the mounting portion 46 providing a relatively continuous extension of the upper surface of cover 14, at least when the locking clip is pivoted to latch as shown in the figures.

The trunnion combination 54 will, however, allow the locking clip to pivot thereabout. This can enhance the ease of releasing the ridge 50 from beneath the mounting edge 52. Further, it may be possible for this release of the ridge to be effected even more easily by manually pressing upon the end of the mounting portion 46 radially inward of the trunnion combination 54 to urge rotation of the locking clip 44.

During microwave reheating of sealed containers, steam will be formed and the air within the container will be warmed. These combine to create an increase in atmospheric pressure within the container. It is known in the art to provide various vents to relieve this pressure during reheating. The cover 14 may be provided with any such prior art vent. It is preferred, however, to take advantage of the pivoting arrangement of the locking clips 44.

As may be seen, one or more of the locking clips 44 may be provided with a vent prong 58 extending downwardly at a position radially outward of the trunnion combination 54. The cover 14 may further include a vent aperture 60 extending therethough at a position just beneath the vent prong 58 and sized to sealingly receive the vent prong 58. As shown in FIG. 4 the vent prong 58 will extend into the vent aperture 60 to thus block and seal the vent aperture 60 when the locking clip is in the locked position shown. However, pivoting the locking clip 44 to the release position (not shown, but counterclockwise rotation in FIG. 4) not only releases the ridge 50 but also removes the vent prong 58 from the vent aperture 60.

By this arrangement, the locking clips 44 may be held in the locked position to securely close and seal the container 10. As the user places container 10 into the microwave oven for reheating, one or more locking clips 44 are manually pivoted to the release position to thus open vent aperture(s) 60 for venting the heating chamber 16 during reheating. Once reheating is completed, the user may pivot the locking clips 44 back to the locked position to safely remove the container 10 from the microwave oven without fear of spilling the hot contents.

From the foregoing it will be seen that this invention is one well adapted to attain all ends and objects set forth above together with the other advantages which are inherent within its structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth of shown in the accompanying drawings is to be interpreted as illustrative, and not in a limiting sense.

What is claimed is:

1. A microwave reheating container, comprising:
   a base having a generally concave upward configuration with a bottom and at least one side wall defining a base rim;
   a cover having a cover rim, said cover rim having a size and shape mating to said base rim;
   wherein said base and said cover together define a heating chamber;
   wherein said base is formed of a base mold core having an inner layer being crystalline polyethylene terephthalate (CPET) forming a crystalized thermoplastic raw material (TRM) interior food contact surface in direct contact with an outer layer of amorphous polyethylene terephthalate (APET), and a thermoplastic copolyester (TPC) base coating overmolded to an exterior surface of said base core; and
   wherein said cover is formed of a cover mold core having an inner layer being CPET forming a crystalized TRM interior food contact surface in direct contact with an outer layer of APET, and a TPC cover coating overmolded to an exterior surface of said cover core;
   wherein the TPC comprises polyethylene terephthalate monomers.

2. A container as in claim 1, wherein said base core is a monolithic structure extending across said base rim, and further including a base core flange extending downward from the outer edge of said base rim; said cover core is a monolithic structure extending across said cover rim, and further including a cover core flange extending upward from the outer edge of said cover rim; whereby food in said heating chamber does not contact said TPC base coating or TPC cover coating.

3. A container as in claim 1, wherein said cover includes a peripheral groove, and a sealing ring is mounted in peripheral groove, said sealing ring contacting said base when said cover is resting upon said base.

4. A container as in claim 3, wherein said base core is a monolithic structure extending across said base rim, and further including a base core flange extending downward from the outer edge of said base rim; said cover core is a monolithic structure extending across said cover rim, and further including a cover core flange extending upward from the outer edge of said cover rim; whereby food in said heating chamber does not contact said TPC base coating or TPC cover coating.

5. A container as in claim 3, further including at least one locking clip mounted to said cover, each said at least one locking clip having a latch portion extending downward beyond said cover rim, and is selectively engaged to said base for securing said cover to said base.

6. A container as in claim 5, wherein said base core is a monolithic structure extending across said base rim, and further including a base core flange extending downward from the outer edge of said base rim; said cover core is a monolithic structure extending across said cover rim, and further including a cover core flange extending upward from the outer edge of said cover rim; whereby food in said heating chamber does not contact said TPC base coating or TPC cover coating.

7. A container as in claim 5, wherein each said at least one locking clip further includes a mounting latch portion within the periphery of said cover, and wherein said mounting latch portion is pivotally connected to said cover.

8. A container as in claim 7, wherein said base core is a monolithic structure extending across said base rim, and further including a base core flange extending downward from the outer edge of said base rim; said cover core is a monolithic structure extending across said cover rim, and further including a cover core flange extending upward from the outer edge of said cover rim; whereby food in said heating chamber does not contact said TPC base coating or TPC cover coating.

9. A container as in claim 7, wherein said mounting latch portion of said at least one locking clip includes a vent prong extending downwardly at a position radially outward of a pivot point of said at least one locking clip; said cover including a vent aperture extending therethough at a position just beneath the vent prong and sized to sealingly receive the vent prong; whereby pivoting of said at least one locking clip in opposite directions will cause said vent prong to respectively enter or exit said vent aperture.

10. A container as in claim 9, wherein said base core is a monolithic structure extending across said base rim, and further including a base core flange extending downward from the outer edge of said base rim; said cover core is a monolithic structure extending across said cover rim, and further including a cover core flange extending upward from the outer edge of said cover rim; whereby food in said heating chamber does not contact said TPC base coating or TPC cover coating.

11. A microwave reheating container, comprising:
   a base having a generally concave upward configuration with a bottom and at least one side wall defining a base rim;

a cover having a cover rim, said cover rim having a size and shape mating to said base rim;

said base being formed of a base core having a crystalized thermoplastic raw material (TRM) interior food contact surface, and a thermoplastic copolyester (TPC) base coating overmolded to an exterior surface of said base core that is defined by a layer of amorphous polyethylene terephthalate (APET); and said cover being formed of a cover core having a crystalized TRM interior food contact surface, and a TPC cover coating overmolded to an exterior surface of said cover core;

wherein said base core is a monolithic structure extending across said base rim, and further including a base core flange extending downward from the outer edge of said base rim; said cover core is a monolithic structure extending across said cover rim, and further including a cover core flange extending upward from the outer edge of said cover rim; whereby food in a heating chamber defined by the base and cover does not contact said TPC base coating or TPC cover coating.

12. A container as in claim 11, wherein said cover includes a peripheral groove, and a sealing ring is mounted in peripheral groove, said sealing ring contacting said base when said cover is resting upon said base.

13. A container as in claim 11, wherein said base core and said cover core each include two layers:
   an inner layer of said two layers being crystalline polyethylene terephthalate and forming said crystalized TRM interior food contact surface; and
   an outer layer of said two layers being amorphous polyethylene terephthalate.

14. A container as in claim 11, including at least one locking clip mounted to said cover, each said at least one locking clip having a latch portion extending downward beyond said cover rim, and is selectively engaged to said base for securing said cover to said base.

15. A container as in claim 14, wherein each said at least one locking clip further includes a mounting latch portion within the periphery of said cover, and wherein said mounting latch portion is pivotally connected to said cover.

16. A container as in claim 15, wherein said mounting latch portion of said at least one locking clip includes a vent prong extending downwardly at a position radially outward of a pivot point of said at least one locking clip; said cover including a vent aperture extending therethough at a position just beneath the vent prong and sized to sealingly receive the vent prong; whereby pivoting of said at least one locking clip in opposite directions causes said vent prong to respectively enter or exit said vent aperture.

* * * * *